(12) United States Patent
Báder

(10) Patent No.: US 9,269,040 B2
(45) Date of Patent: Feb. 23, 2016

(54) EVENT MONITORING DEVICES AND METHODS

(75) Inventor: Attila Báder, Paty (HU)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 277 days.

(21) Appl. No.: 13/985,106

(22) PCT Filed: Mar. 1, 2011

(86) PCT No.: PCT/EP2011/052994
§ 371 (c)(1),
(2), (4) Date: Aug. 13, 2013

(87) PCT Pub. No.: WO2012/116731
PCT Pub. Date: Sep. 7, 2012

(65) Prior Publication Data
US 2013/0325772 A1    Dec. 5, 2013

(51) Int. Cl.
*G06N 3/02* (2006.01)
*G06F 9/54* (2006.01)
*H04L 12/24* (2006.01)

(52) U.S. Cl.
CPC *G06N 3/02* (2013.01); *G06F 9/542* (2013.01); *H04L 41/0631* (2013.01); *H04L 41/16* (2013.01)

(58) Field of Classification Search
CPC ...... G06N 3/02; G06F 9/542; H04L 41/0631; H04L 41/16
USPC .......................................................... 706/20
See application file for complete search history.

(56) References Cited

U.S. PATENT DOCUMENTS

| 2003/0088669 | A1 | 5/2003 | Marilly et al. |
| 2005/0149464 | A1* | 7/2005 | Nugent ........................... 706/20 |
| 2007/0156916 | A1* | 7/2007 | Schiefer ......................... 709/232 |
| 2010/0281150 | A1* | 11/2010 | Sailhan et al. .................. 709/223 |
| 2011/0119215 | A1* | 5/2011 | Elmegreen et al. ............. 706/37 |

FOREIGN PATENT DOCUMENTS

| EP | 0759591 A1 | 2/1997 |
| WO | 0186439 A2 | 11/2001 |

OTHER PUBLICATIONS

Souto E. et al., "Mires: a publish/subscribe middleware for sensor networks", Pers Ubiquit Comput, 2006, 10, pp. 37-44.*

* cited by examiner

*Primary Examiner* — Stanley K Hill
*Assistant Examiner* — Dave Misir
(74) *Attorney, Agent, or Firm* — Patents on Demand, P.A.; Brian K. Buchheit; Scott M. Garrett

(57) ABSTRACT

A device (10) for processing events (4), including an identifier (8) identifying the event's type, and at least one parameter carrying information about a process, includes an event selector (20) and an event type recognizer (30). The device (10) is configured for receiving an event (4), providing the event (4) to the event selector (20), and providing the identifier (8) to the event type recognizer (30). The event selector (20) stores the provided event (4). The event type recognizer (30) determines, using at least one neural network unit, whether the identifier (8) corresponds to a type for which a subscription exists, and, if so, it causes the event selector (20) to transmit the event (4S) for processing by one or more applications. Furthermore, the device (10) is configured for allowing one or more types of event to be subscribed to. The invention also relates to methods for processing events (4).

20 Claims, 4 Drawing Sheets

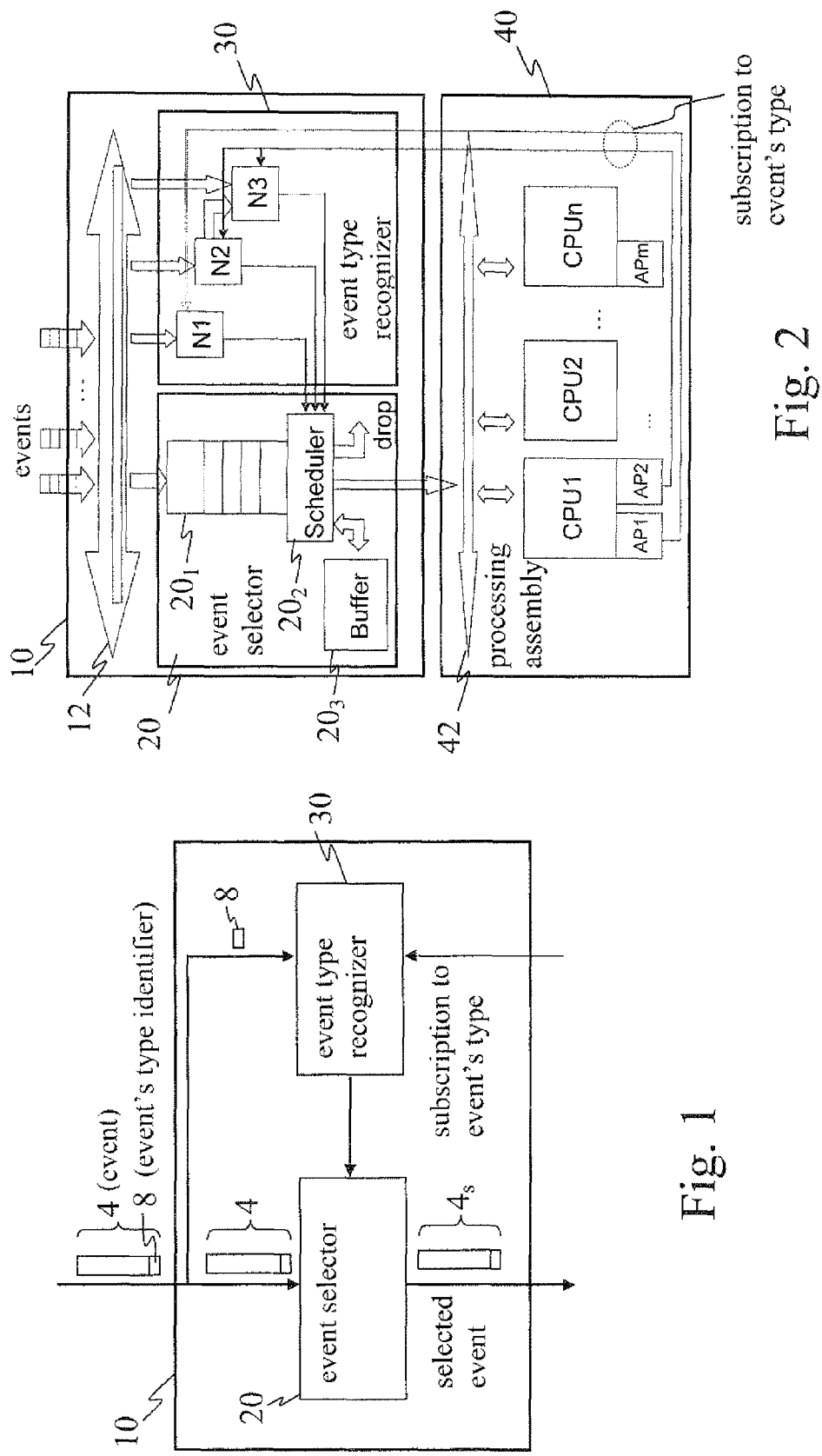

EVENT MONITORING DEVICES AND METHODS

TECHNICAL FIELD

The present invention relates to devices and methods for monitoring events activated, i.e. generated, within a system, such as for instance a telecommunication system. The invention may for instance be used for monitoring performance management events activated by nodes of a telecommunication network, without being limited however to this application.

BACKGROUND

In the context of telecommunication networks notably, there is a constant need for easing and improving the control, monitoring and management of telecommunication network nodes, such as nodes belonging to an access network, a radio access network, a core network, or any other network. This may be for instance for monitoring, troubleshooting or optimization purposes.

In particular, a network node may be configured to issue events that an operation support system (OSS) should monitor in order to take, if necessary, corrective or optimization actions, etc. An event may report the value of a counter indicating the number of occurrences of a particular state at a network node during a time period. An event may also be used to collect aggregate information about the operation of the network node, or to report measurements made in the network, or internal changes having taken place within the node or its environment.

It is desirable to provide devices and methods to improve the control, monitoring and management of a telecommunication network notably, while taking into account the need for computational efficiency, flexibility of operation and ease of use, and the need to reduce the costs of the network infrastructure and the operational cost.

SUMMARY

To meet or at least partially meet the above-mentioned goals, such devices and methods are defined in the independent claims. Advantageous embodiments are defined in the dependent claims.

In one embodiment, a device is configured for processing events, wherein an event includes an identifier identifying the event's type, and at least one parameter carrying information about a process. The device includes an event selector and an event type recognizer. The device is configured for receiving an event, providing the event to the event selector, and providing the event's identifier to the event type recognizer. The event selector is configured for storing the provided event. The event type recognizer is configured for determining, using at least one neural network unit, whether the provided identifier corresponds to a type for which a subscription exists, and, if so, causing the event selector to transmit the event for processing by one or more applications. The device is further configured for allowing one or more types of event to be subscribed to.

The device enables to efficiently handle a number of events to be processed. The device is especially adapted to a situation where applications in charge of processing the events are interested in some of the events only and, therefore, only some of the events received by the device have to be selected for transmission and further processing by the applications. In contrast to a system wherein log files would be used to store events and wherein the log files would then be parsed by applications to identify events of interest, the device of this embodiment enables efficient and real-time processing of events. The device is particularly useful for instance for network management systems such as telecommunication network management systems wherein a considerable number of events reporting various information from telecommunication network nodes are sent towards an OSS in charge of handling these events and possibly performing accordingly corrective, optimization, or reporting actions, or the like. In other words, the device enables efficient, flexible and dynamic processing and filtering of received events.

An event is a message issued by a process, for instance running on a telecommunication network node, and transmitted to an event handler in charge of dispatching events to the applications or components having subscribed to receive them. An event is therefore a message used in the context of a publish/subscribe mechanism, in which an event handler obtains events published by processes and distributes them to each of the applications (such as software applications) that have subscribed, typically in operation (runtime), to this type of events.

The type of an event is one of its characteristics, identified for instance by one or more bits in a particular field of the event. The type characterizes a class of events.

An application may subscribe to receive the events of a particular class of events, i.e. of a particular type. An event includes an identifier identifying the event's type.

An event also includes at least one parameter carrying information relating to a process, such as the process from where the event originates. The information may for instance indicate when the event was generated or issued (such as for instance by the use of a time stamp), by which component or node the event was generated or issued (such as for instance by the use of a cell identifier), the value of a counter to which the event relates, information about the state of a node or its environment, etc.

A neural network unit may be implemented as hardware in the form of a neural network chip.

A neural network chip is an integrated circuit implementing interconnected artificial neurons for recognizing patterns. A neural network chip is capable of being trained to recognize efficiently some patterns in the input data. In one embodiment, the neural network chip included on the event type recognizer implements a feedforward neural network. In a feedforward neural network, connections between units do not form cycles or loops.

A neural network unit may alternatively be implemented as software, i.e. implemented in the form of one or more computer programs, so as to be configured to perform the same functions as those of the above-mentioned neural network chip, namely implementing interconnected artificial neurons for recognizing patterns and being capable of being trained to recognize efficiently some patterns in the input data. It may be advantageous to implement first a neural network unit using software in a prototype, in order to test the device operation. In order to achieve a good performance, which may notably exceed the performance of general purpose processors (GPPs), it is however advantageous to implement the neural network unit(s) as hardware. This avoids the need for the events to be processed first by GPPs, which may cause a bottleneck.

In the remainder of the description and in the drawings, the references to neural network chip(s) may be generalized to neural network unit(s), being either implemented as hardware in the form of neural network chip(s), notably advantageous for performance reasons, or implemented as software, notably advantageous for use in a prototype.

In one embodiment, a method is used for processing events, wherein, as mentioned above, an event includes an identifier identifying the event's type, and at least one parameter carrying information about a process. The method includes an event selection procedure, an event type recognizing procedure, and a subscribing procedure. The method includes receiving an event, providing the event as input to the event selection procedure, and providing the event's identifier as input to the event type recognizing procedure. The event selection procedure includes storing the event provided as input. The event type recognizing procedure includes determining, using at least one neural network chip, whether the identifier provided as input corresponds to a type for which a subscription exists, and, if so, causing the event selection procedure to transmit the event for processing by one or more applications. The subscribing procedure includes allowing one or more types of events to be subscribed to.

BRIEF DESCRIPTION OF THE DRAWINGS

Embodiments of the present invention shall now be described, in conjunction with the appended figures, in which:

FIG. 1 schematically illustrates a device for processing events in one embodiment of the invention;

FIG. 2 schematically illustrates a device for processing events, along with a processing assembly including computer processing units (CPUs) for hosting applications to process the selected events, in one embodiment of the invention;

DETAILED DESCRIPTION

Figure 3:
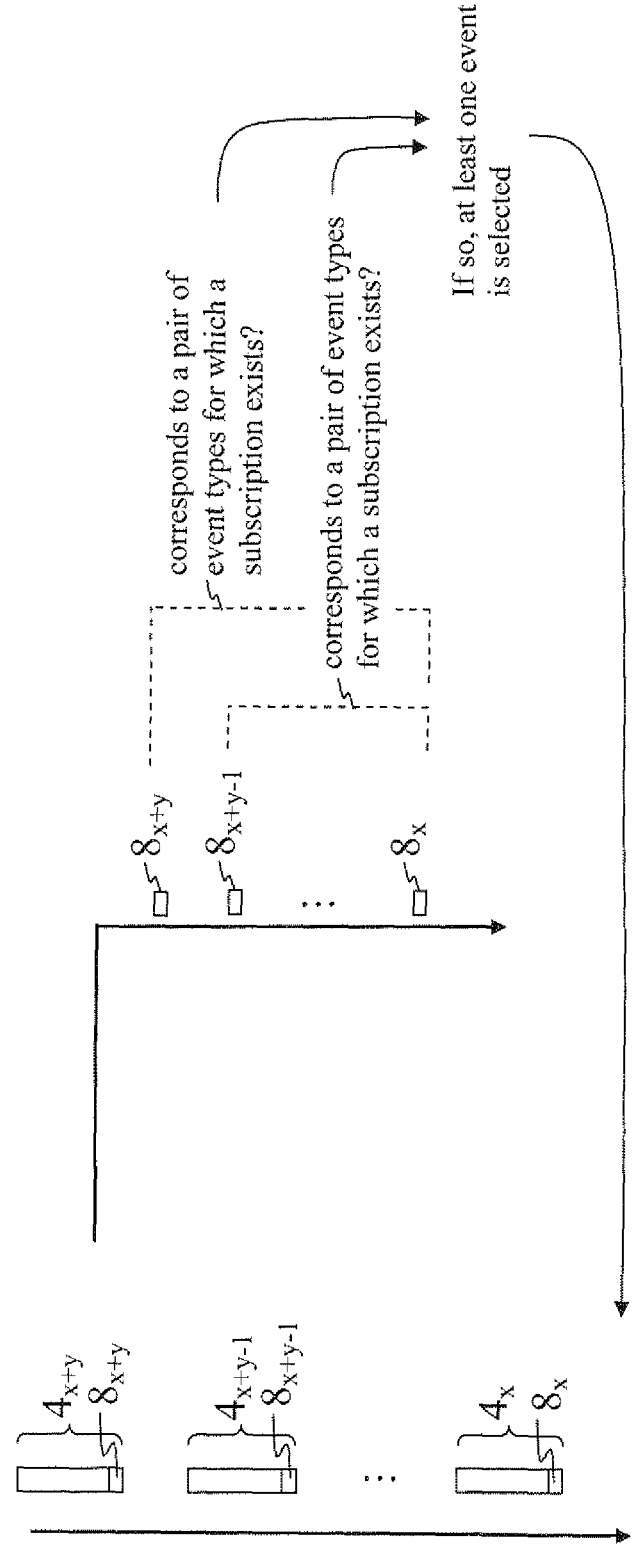
FIG. 3 logically illustrates a flow of steps taking place during the process of recognizing a pair of event types, in one embodiment of the invention.

The present invention shall now be described in conjunction with specific embodiments. These specific embodiments serve to provide the skilled person with a better understanding, but are not intended to in any way restrict the scope of the invention, which is defined by the appended claims.

FIG. 1 schematically illustrates a device 10 in one embodiment of the invention. The device 10 is configured for receiving events 4. Each event 4 may be in the form of a message including a header itself including an identifier 8 identifying the event's type. The identifier 8 may be explicitly indicated in a particular field of the message. The event header may include bits or bytes in fields in a structure manner, so that the device 10 knows which bits or bytes should be read in order to extract the relevant portion of the message to obtain the identifier 8. Alternatively, the whole event header may be processed and the identifier 8 may be extracted in the process. The event 4 may include in the core of the message one or more parameters carrying information about a process.

When the device 10 receives an event 4, it provides the event 4 to the event selector 20 and the identifier 8 to the event type recognizer 30. The event type recognizer 30 does not receive the complete event 4. Upon receiving the event 4, the event selector 20 stores it, for instance in a first-in-first-out (FIFO) queue. In parallel, the event type recognizer 30 determines, using at least one neural network chip (not illustrated in FIG. 1), whether the identifier 8 corresponds to a type for which a subscription exists. Since the event type recognizer 30 includes one or more neural network chips, the event type recognizer 30 is capable in a few clock cycles to recognize whether the inputted identifier 8 corresponds to a type for which a subscription exists, i.e. a type which the event type recognizer 30 and in particular its neural network chip(s) have been trained to recognize. If the event type recognizer 30 determines that the identifier 8 corresponds to a type for which a subscription exists, the event type recognizer 30 provides a specific output signal to the event selector 20. This specific output signal causes the event selector 20 to transmit the event $4_s$ that corresponds to, and includes, the identifier 8 recognized by the event type recognizer 30. In that sense, it can be said that the event type recognizer 30 controls the event selector 20.

In other words, in the event type recognizer 30, the identifiers 8 are processed and a trigger, such as for instance a bit signal "0" or "1", is sent to the event selector 20, which then opens appropriate gates to drop, buffer or process (i.e., transmit) the events 4. The purpose of buffering events 4 will be understood later in the description in the context of recognizing a set of identifiers 8. The gate to drop may be by default open, while the ones to buffer and process may be by default closed. The event type recognizer 30 and the event selector 20 are synchronized, which means that, when a trigger arrives from the neural network chip(s) of the event type recognizer 30, the event selector 20 gates the appropriate event(s) 4.

This however does not exclude more elaborate kinds of communication between the event type recognizer 30 and the event selector 20. For instance, the event type recognizer 30 may send not only a trigger, such as a one-bit signal, to the event selector 20 but the event type recognizer 30 may send a control message including more information, such as for instance information identifying the event to be processed in the event selector 20 in response to the control message from the event type recognizer 30. The result of the operation is however the same, namely most of the events 4 are dropped, the events $4_s$ for which a subscription exists are sent for further processing, and events 4 that are candidate for being the first event of a set of events to be recognized are buffered. As mentioned above, the purpose of buffering will be understood later in the description in the context of recognizing a set of identifiers 8.

In FIG. 1, an event which is selected by the event selector 20 for transmission to, and later processing by, one or more applications, such as for instance OSS applications, is labelled with reference "$4_s$". The complete process may occur in real-time and may only require storing the events 4 in the device 10 during a very short time period.

The device 10 also provides appropriate input facilities, such as hardware input ports or software interfaces, for allowing applications to subscribe to an event type, in order to receive the events 4 of to this type. This enables an application to perform processing of the event $4_s$ of the type(s) to which they have subscribed. The subscription to a particular type may lead the device 10 to train the neural network chip(s), or one of them if there is more than one neural network chip, to recognize the identifier 8 associated with that type. In other words, the neural network chip(s) are configurable to recognize new event types. There may be new event types being created and sometimes the event type identifiers are changed. The device 10 is capable of adapting itself to these changes through the training process, without a hardware update or upgrade.

The device 10 can therefore be viewed as acting as an event handler or at least performing some of the functions of an event handler. The dispatching of events $4_s$ to applications having subscribed to a particular type of events $4_s$ may be carried out by additional means provided within the device 10 or outside it.

OSS applications may therefore be arranged to subscribe to some events that are for instance expected to regularly report the state of counters maintained in network nodes. The events are sent in real-time through a streaming interface to the OSS or any other performance management system through the device 10. OSS and performance management systems or applications collect the event information. Alternatively the events are recorded for a result output period (ROP) in a file, and this file is sent to OSS at the end of each ROP. In this embodiment, the events are extracted from the file in the OSS and the events are sent to device 10. It is preferable to use short result output period, or if it is possible, use streaming events in order to decrease the response time to the network, as well as to monitor the network operation real-time.

OSS applications (implemented in either OSS or in another performance management system) subscribe to events to monitor counters or key performance indicators (KPIs), to collect any measurement results from event parameters, etc. These observation functions can be based on single events or set of events (referred to as "correlated events" from the point of view of the OSS applications).

Neural network chips are particularly adapted for event recognition and selection in the device 10. Indeed, artificial neural networks may be used for fast pattern recognition. For certain optimization and pattern recognition problems, neural network chips are much faster than legacy processors. Integrated neural network chips are available in the market implementing several hundreds or thousands interconnected neurons. Each neural network chip is capable of recognizing the same number of patterns as the number of the interconnected neurons. For instance, a fully connected Hopfield-type neural network consisting of N neurons can be trained to store N orthogonal states and recognize N different patterns.

The neural network chips are trained in order to recognize the required patterns. Training may include setting the coupling weights between the neurons. The output of the individual signal is the sum of the input signals weighted by the coupling strengths: $y_j = \text{Sum}_i(w_{ij} * x_i)$. The learning process is adaptive. Adaptive operation makes it possible to train the neural network chips to recognize new patterns during operation. An example of simple learning process is to change the coupling weights based on the Hebb rule when the output is positive: $\Delta w_{ij} = r * x_i * y_j$, where $w_{ij}$ is the coupling weight between neuron i and j, r is the learning rate, $x_i$ is the input signal from neuron i, $y_j$ is the output signal of neuron j.

In relation to configuring pattern recognition and to recognizing the patterns in the neural network chips, patterns are said to be orthogonal if they can be recognized with certainty (i.e., 100% sure). For instance, whether the bit string "0010" and "0011" are orthogonal depends on how they are stored in the neural network chip, namely how the coupling constants are set. Methods exist to set the coupling constants to store patterns orthogonally. A common and simple method uses the Hebb rule.

If the coupling matrix in a fully connected network is set as $$w_{ij} = \frac{1}{p} \sum_{k=1}^{p} x_i^k x_j^k$$

where $w_{ij}$ is the weight of the connection from neuron j to neuron i, p is the number of training patterns, and the kth input for neuron i, then the output $$y = \sum_j w_j x_j$$

will be "0010" if the input is the bit string "0010", the output will be "0011" if the input is the bit string "0011", and the output will be "0000" in all other cases. Thus, in this case, if the two patterns are stored orthogonally, the output is completely determined. N neurons can store maximum N patterns orthogonally in a fully connected network if the neurons are binary.

In one embodiment, the number of event types is less than the number of neurons in the neural network chip(s), therefore using appropriate learning rules they can be stored orthogonally and recognized with 100% confidence.

In one embodiment, the neural network chips are configured to recognize subscribed event identifiers 8 as orthogonal patterns. In this manner, there is no uncertainty of the pattern recognition. It is however also possible to operate neural network chips with non-orthogonal patterns. In this case, the neural network chip(s) can handle more events but the recognition will be less certain. There is a trade off between the number of patterns and success of the recognition.

Trained neural network chips give output only for the configured patterns. In practice, the pattern recognition may be done in a few clock cycles while the training requires a few dozen of cycles. In one embodiment, the neural network chips may be trained in runtime, i.e. when event type identifiers 8 are also received. This means that it is possible to subscribe to new event type identifiers 8 any time during operation, without requiring an interruption of the event type recognition process.

Due to the continuously growing network size, increasing traffic and introduction of new measurement functions into the network, the number of performance management events 4 increase considerably. For instance, in wideband code division multiple access (WCDMA) radio access networks (RAN) and mobile core networks, the number of performance management events 4 generated today are challenging OSS hardware and software infrastructure. It is expected that, after ramp up, the volume of the performance management events 4 in Long Term Evolution (LTE) networks will be one or two orders of magnitude higher than in WCDMA systems. Current event handling solutions will not be able to process such high event rate. In contrast, the device 10 of the invention helps to cope with a very high rate of performance management events 4.

In contrast to performance management solutions based on log files, which require storing a high number of events in files, something which may be impossible or at least inefficient, the device 10 of the invention enables to filter the events 4 rather than storing and parsing all events for further processing in the network management systems.

An architecture based on the device 10 is scalable in that the similar logic may be applied in parallel, in order to deal with a higher input rate. Namely, additional neural network chips may be added to the device 10 if necessary.

In one embodiment, events 4 are performance management events. Performance management events are generated in the context of managing the performance of a network and its constituent network nodes. This may be for instance for monitoring, troubleshooting, or optimization purposes.

Monitoring may be needed to ensure the correct operation of the network and to detect any degradation or fault during operation. Troubleshooting functions may aim to identify the cause of an error in a complex system, such as a communication network. Optimization functions may be used to improve network quality and utilization of existing network resources. The performance management events may be used by OSS applications to carry out corrective, optimization or reporting actions, or any other actions.

Performance management in mobile networks may be based on statistical counters or event recordings. Statistical counters are used to collect aggregated information of the network operation. Counters may be implemented in the network nodes.

Events 8 may be generated by the network nodes to report internal changes, measurement results (internal events) and situations relating to the communication with other network nodes (protocol-related events, or external events). For different events, different event types are generated. Details of the operation or measurements are included in the parameter(s) of the events 4. The device 10 may also be used in a fault manager solution of a telecommunication network where a large number of failures are reported in the form of events 4 and the management system has to filter and recognize the important ones, and maybe to identify correlation of relevant faults from different sources.

In one embodiment, the event type recognizer 30 is configured for, if it has been determined that the identifier 8 does not correspond to a type for which a subscription exists, causing the event selector 20 within the device 10 to drop the event 4 (i.e. no longer storing the event 4 and deleting it). For instance, at each clock cycle, an event 4 may be received by the device 10. The event 4 is queued in a FIFO queue of the event selector 20 and the event type identifier 8 is provided to the event type recognizer 30, which, for each received event type identifier 8, provides an output. The output may be for instance a bit of value "1" to instruct the event selector 20 to transmit the event 4 stored at the output end of its FIFO queue, and the output may be a bit of value "0" to instruct the event selector 20 to drop (i.e. not to transmit) the event 4 stored at the output end of its FIFO queue.

In one embodiment, the device 10 is such that subscribing by an application to one or more type of events causes the event type recognizer 30 to train the neural network chip(s) to recognize a pattern (in the event type identifier 8 inputted at the event type recognizer 30) corresponding to the event's type. Neural network chips are particularly adapted to be trained to efficiently recognize, often in only a few clock cycles, some patterns.

In one embodiment, the event selector 20 includes a first-in-first-out (FIFO) queue $20_1$ to store the events 4 that it receives.

In one embodiment, the event selector 20 and the event type recognizer 30 are configured to operate using the same clock signal.

In one embodiment, the event type recognizer 30 is configured so that only a portion of the identifier 8 is used in determining whether the identifier 8 corresponds to a type for which a subscription exists. If a neural network chip is trained to recognize a few types from an inputted sequence of bits, the consideration of only a portion of the inputted bits may be sufficient to recognize the type.

In one embodiment, the event type recognizer 30 is further configured for determining, using the neural network chip(s), whether a number n of identifiers 8 correspond to a set of types being a set for which the subscription exists. The set includes a number n of types, wherein n is an integer equal or larger than 2. If it is determined that the number n of identifiers 8 correspond to the set for which a subscription exists, the event type recognizer 30 causes the event selector 20 to transmit at least one of the events $4_s$ corresponding to the set of types for further processing by one or more applications.

This enables an application not only to subscribe to a particular type of events, but also to more than one event received during a certain time period or within a certain number of clock cycles. The time period or number of clock cycles may be configurable parameters of the device 10. The event selector 20 may include a buffer to store events provisionally dropped from the output end of the FIFO queue of the event selector 20 for later use if a set of types is recognized by the event type recognizer 30. If a set of types for which a subscription exists is recognized, all events corresponding to the recognized set of types may be transmitted to the applications having subscribed thereto. Alternatively, only some of the events of the set of events corresponding to the recognized set of types may be transmitted.

In other words, one or more neural network chips, such as two neural network chips, may be trained to recognize the set of event types, such as a pairs of event types. One of the neural network chips may be trained to recognize the first event type of the correlated event pairs while another neural network chip may be trained to recognize event type pairs. The first neural network chip controls the event selector 20 in that, when the first neural network chip recognizes an event type identifier 8, the output triggers the event selector 20 to write the corresponding event to a buffer.

The event correlation (the recognition of the pair of event types) is then done by the second neural network chip of the neural network chip set. The second neural network chip is trained to recognize the event type identifier pairs. When an event type pair is recognized, the second neural network chip causes the event selector 20 to transmit the event type pair, such as for instance by writing the event type pair on an output bus. From the output bus, the appropriate processes (the applications) running on some CPUs may read the events $4_s$. The processes running on the CPUs receive and process only the subscribed events $4_s$. The rate of the events $4_s$ the CPUs have to deal is much lower than the original event rate (or primary event rate). In other words, the rate downstream of the device 10 is much lower than the rate upstream of the device 10. The rate downstream of the device 10 may be several orders of magnitude lower than the rate upstream of the device 10.

In one embodiment, the above-referred set of types includes two types. Namely, n equals 2. The event type recognizer 30 is therefore, in this embodiment, configured to recognize a pair of correlated events. It has been recognized that neural network chips are particularly adapted to recognize pairs of correlated events.

In one embodiment, the event type recognizer 30 is configured so that only a portion of each one of the number n of identifiers 8 is used in determining whether a number n of identifiers 8 correspond to a set of types being a set for which a subscription exists.

In other words, in this embodiment, the recognition of identifiers and the corresponding selection of events are carried out based on subset of the identifier 8. If the primary event rate (i.e., downstream of the device 10) of a specific event type is high, for instance one million events per second, the occurrence of two specific event types may be several orders of magnitude less, for instance one event per second.

For example, if 6 bits are used out of 8 bits of the identifier 8, four event types may be detected. This means that correlated rate may be 16 events per second, which is still low comparing to one million events per second. 16 events per second can easily be processed digitally by the CPU and the unnecessary events 4 are dropped.

Furthermore, if the processed bits are chosen appropriately, there might be that there will not be unnecessary events, e.g. if it is known that the bit strings "10101010" and "10101011" never occur together during a given time period, one can listen to only "1010101" and "1010101".

FIG. 2 schematically illustrates a device 10 for processing events 4 in one embodiment of the invention. Furthermore, on a group of CPUs, labelled "CPU 1", "CPU2", . . . , "CPUn" on FIG. 2, one or more applications, labelled "AP1", "AP2", . . . , "APm", may be running. The applications may be software applications.

The device 10 includes an event selector 20 and an event type recognizer 30, as described with reference to FIG. 1. Events 4 are inputted in the device 10, as schematically illustrated by the arrows reaching the device 10 from the top of FIG. 2. The events 4 are stored in a queue $20_1$ of the event selector 20 and the identifiers 8 of the events 4 are provided to the event recognizer 30 for processing by its neural network chips. In FIG. 2, three neural network chips N1, N2, N3 are schematically illustrated, although one neural network chip, two neural network chips or more than three neural network chips may be used in a device 10 of the invention.

The events 4 arrive through one or more interfaces (i.e., event interfaces) to an input bus 12 of the device 10. The event selector 20 and the event recognizer 30 may be driven by the same clock signal.

The event types are identified by the event type identifier 8, which may be one or more bits in a field of the event's header. The identifier 8 is processed by the event type recognizer 30.

Applications, such as performance management applications, are running on a processing assembly 40 including one or more CPUs CPU1, CPU2, . . . , CPUn. Each application AP1, AP2, . . . , APm, runs one or more software threads. Monitors can be activated in real-time in an application, which cause it to subscribe to some event type. Each monitor of an application expects one or more events as input. Monitors can be based on single events (of one type), or two or more correlated events. The application subscribes to receive the required events from the device 10.

The event type recognizer 30 includes at least one neural network chip N1 that is trained to recognize the event type identifiers 8 of the single events. More neural network chips may be used, especially if the input interface is smaller than the length of the event identifier 8, if there are more event types to recognize that the number of patterns that a neural network chip can be trained to recognize, or if the event rate is higher than the rate that a single neural network chip can handle.

Neural network chips may be feedforward type neural network chips that have at least the following interface: a n-bit wide parallel input data interface, a n-bit wide parallel output data interface, and an output signal interface (for instance, just one bit). In addition, a training interface is provided where the coupling of the artificial neurons of the neural network chip can be set.

A subscription means that a neural network chip is trained to recognize the event type identifiers 8 of the desired events 4. Implementing a subscription may be carried out by setting the coupling constants of the artificial neurons of the neural network chip, for instance based on the Hebb rule.

The input data interface of the neural network chip N1 receives the event type identifier 8. In one embodiment, the input data interface of the neural network chip N1 has the same number of parallel input bits as the number of bits of the event type identifier 8. In this embodiment, the event type identifier 8 can be read in one step, i.e. in one clock cycle. In one embodiment, the input data interface of the neural network chip N1 is wider than the number of bits of the event type identifier 8, and only a portion of the input pins are used. In one embodiment, the input data interface is smaller than the number of bits of the event type identifier 8, and the neural network chip can either read the full identifier in more than step, i.e. in more than one clock cycle, or only the most relevant bits are processed. In the latter case, the events transmitted to the processing assembly 40 may include more events than just those subscribed to by the applications, but the event rate downstream of the device 10 is still lower than the event rate upstream of the device 10. The unnecessary events are dropped from the event selector 20.

The monitoring of a set of events, here referred to as correlated events, may be carried out by recognizing the set of events by the device 10 as illustrated in FIG. 2, which additionally includes a pair of neural network chips including a first neural network chip N2 and a second neural network chip N3, in addition to the neural network chip N1. The first neural network chip N2 is trained to recognize the first event of the correlated event pairs. The positive output signal of the first neural network chip N2 serves as trigger of a scheduler $20_2$ of the event selector 20. When the trigger is received, the scheduler $20_2$ writes the corresponding event in a buffer $20_3$. The first neural network chip N2 may work basically in the same manner as neural network chip N1 and can therefore be the same chip type.

The second neural network chip N3 has a double input interface compared to neural networks chip N1, N2. The second neural network chip N3 remains idle until the first neural network chip N2 recognizes the first event type identifier 8. The event type identifier 8 recognized by the first neural network chip N2 is provided to the input of the second neural network chip N3, at least during a time period. The second neural network chip N3 also receives the primary event type identifier rate in parallel to the output of the first neural network chip N2 (as illustrated in FIG. 2 by the arrow from the box labelled N2 to the box labelled N3). There is a timeout period after which the first neural network chip N2 is reset and is waiting for another event pair. The buffer $20_3$ is reset as well either by a timeout or by a trigger received from the first neural network chip N2 or, more generally, from the event type recognizer 30.

The second neural network chip N3 is trained to recognize the pair of correlated event types. When a pair of correlated event types is detected, the second neural network chip N3 triggers the scheduler $20_2$ and the pair of correlated event types is transmitted from the buffer $20_3$ and from the queue $20_1$ of the event selector 20 to the input bus 42 of the processing assembly 40.

In an alternative embodiment, the input interface of the second neural network chip N3 is the same as for neural network chips N1, N2. In other words, neural network chips N1, N2, N3 may be the same type of neural network chips. If the input interface of the second neural network chip N3 is not wide enough to accept two event type identifiers 8, the recognition and correlation determination may be done only for the most relevant bits. For instance, if the input interface of the second neural network chip N3 is n-bit wide, p bits are read from the output interface of the first neural network chip N2 and q bits are read from the primary event type identifier stream, where p+q=n. The pattern recognition process in the second neural network chip N3 is carried out for p and q bits. If n and p bits are chosen appropriately, it is very unlikely that undesirable correlation occurs. In other words, relevant p and q bits may define unambiguously the correlated event pairs.

The device 10 illustrated in FIG. 2 includes three neural network chips to recognize, on the one hand, a single event type identifier using the neural network chip N1 and, on the other hand, a pair of event type identifier using the neural network chips N2, N3. Other configurations are possible and within the scope of the invention. In one embodiment, a device 10 includes only one neural network chip to recognize a single event type identifier. In one embodiment, a device 10 includes only two neural network chips to recognize a pair of event type identifiers. In one embodiment, a device 10 includes only two neural network chips that may be used both to recognize a pair of event type identifiers when the two neural network chips are used and to recognize a single event type identifier when only one of the two neural network chips is used.

FIG. 3 illustrates a logical flow of steps during recognition of a pair of event types for which a subscription exists, in one embodiment of the invention.

On the left-hand side of FIG. 3, the incoming events $4_x, \ldots, 4_{x+y-1}, 4_{x+y}$ are depicted, along with the event type identifiers $8_x, \ldots, 8_{x+y-1}, 8_{x+y}$, wherein x and y are positive integers. The events 4 may be stored in the queue $20_1$ of the event selector 20 (not illustrated in FIG. 3).

In parallel, as illustrated on the right-hand side of FIG. 3, the stream of event type identifiers $8_x, \ldots, 8_{x+y-1}, 8_{x+y}$ is depicted. In an event type recognizer 30 configured for recognizing a pair of event types over a time period (not illustrated in FIG. 3) or over a number y of received events 4 (as illustrated in FIG. 3), the event type recognizer 30 determines, for each event type $8_x$, whether any one of the pairs $\{8_x, 8_{x+1}\}$, $\{8_x, 8_{x+2}\}, \ldots, \{8_x, 8_{x+y-1}\}, \{8_x, 8_{x+y}\}$ corresponds to a pair of event types for which a subscription exists, the subscription being a subscription for a pair of event types rather than a subscription for a single event type. If so, the event type recognizer 30 causes the event selector 20 to select at least one event of the pair for transmission to the applications.

Figure 4:
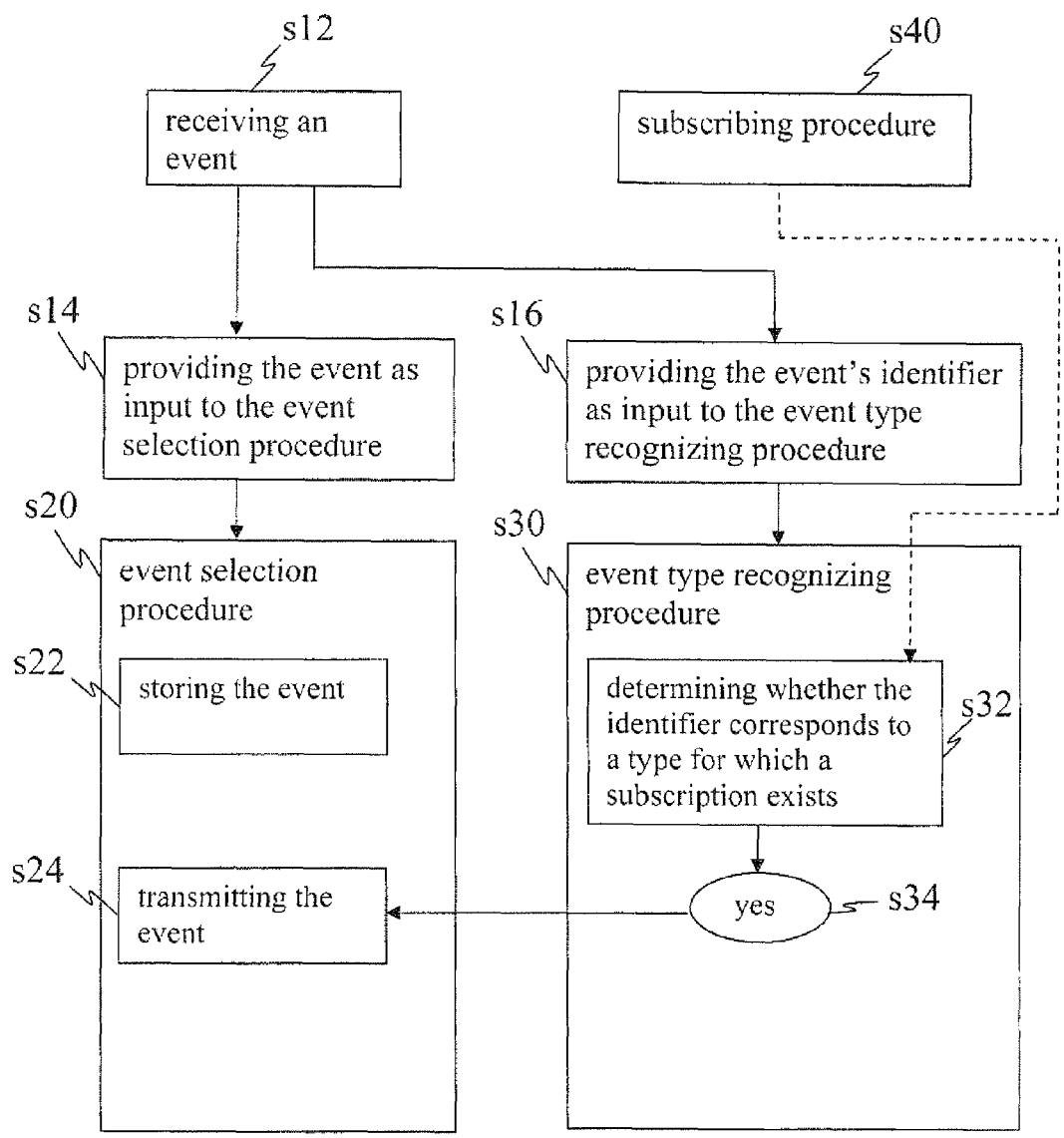
FIG. 4 is a flowchart of a method in one embodiment of the invention.

FIG. 4 is a flowchart of a method in one embodiment of the invention. The method include receiving s12 an event. The event is provided s14 as input to the event selection procedure s20. In parallel, the event's identifier is provided s16 as input to the event type recognizing procedure s30. The event selection procedure s20 includes storing s22 the event. The event type recognizing procedure s30 includes determining s32 whether the identifier corresponds to an event type for which a subscription exists. If so, in step s34, the event type recognizing procedure s30 causes the event selection procedure s20 to transmit s24 the event. The events may then be received and processed by applications having subscribed to one or more particular event types.

The method also includes a subscribing procedure s40 to allow event types to be subscribed to. For instance, applications may therefore be able to subscribe to one or more event types. A subscribing procedure s40 may include training one or more neural network chips so that these neural network chips are configured to recognize in a few clock cycles one or more specific input pattern. The training process may consist in setting weightings of the neural network chip(s).

In one embodiment, the training of the neural network chips is done by directly setting the couplings, and this may therefore be done in very short time, such as one or two clock cycles. In this case, one or two actually processed event may be lost. In one embodiment, the neural network chips require the training to be carried out by sending many input patterns. In that embodiment, it may not be possible to train the neural network chips without interrupting the recognition process.

In FIG. 4, the dotted arrow from box s40 to box s32 is not intended to mean that, directly after the subscribing procedure s40, the step of determining s32 whether an identifier corresponds to a type for which a subscription exists is carried out, but the dotted arrow is rather intended to mean that the subscribing procedure s40 conditions how the determining step s32 is carried out.

Figure 5:
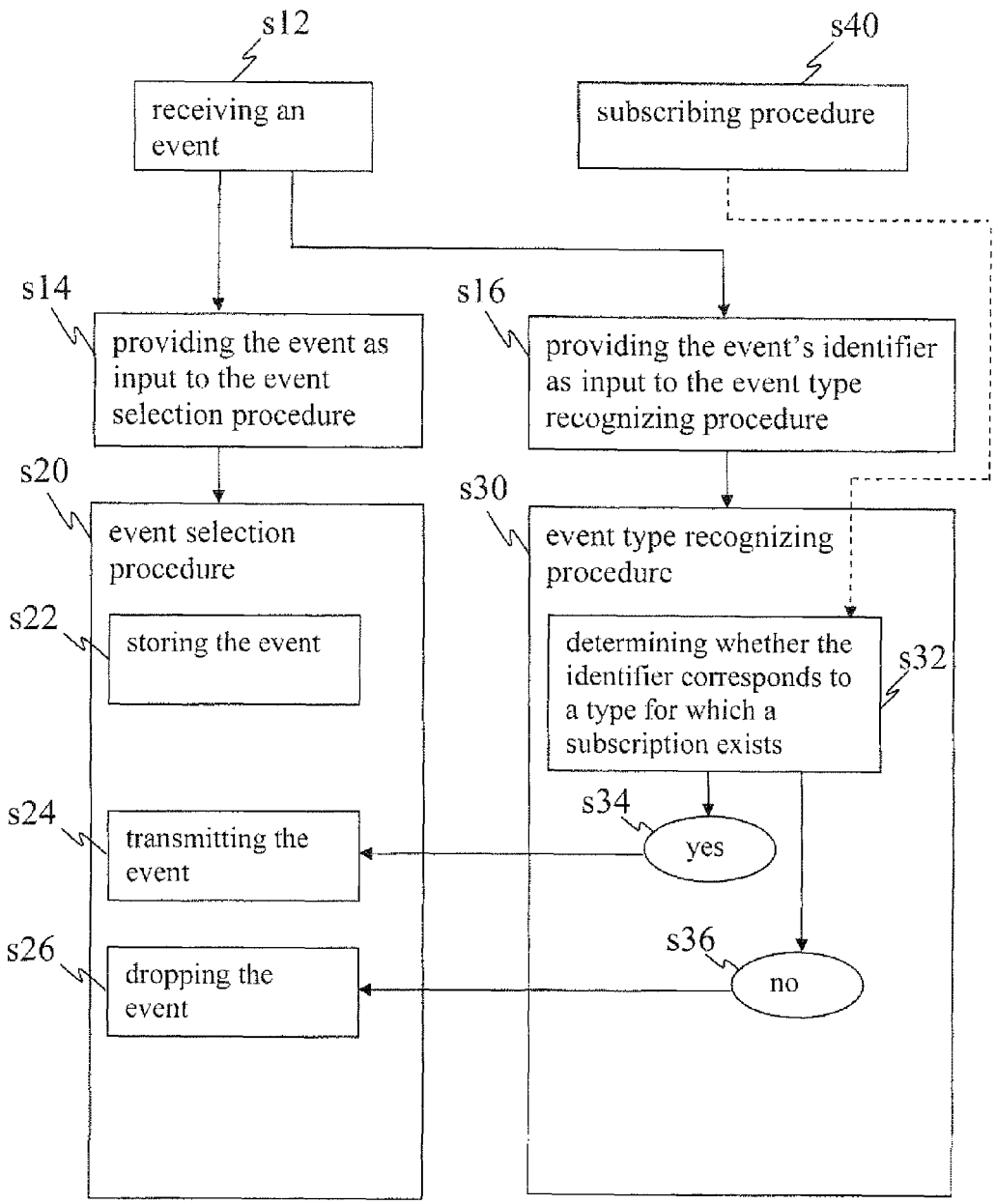
FIG. 5 is a flowchart of a method in one embodiment of the invention, further illustrating a step of dropping an event.

FIG. 5 is a flowchart of a method in one embodiment of the invention which differs from the method illustrated in FIG. 4 in that, in FIG. 5, if it is determined s32 that an event's identifier does not correspond ("no", in step s36) to a type for which a subscription exists, the event type recognizing procedure s32 causes the event selection procedure s20 to drop s26 the event 4. This may for instance be carried out by outputting, by the event type recognizing procedure s30, an output bit, an output string of bits or any kind of signal recognized by the event selection procedure s20 as an instruction to drop s26 the event at the output end of its queue. In an alternative embodiment, the absence of any output from the event type recognizing procedure s30 at a point in time causes the event selection procedure s20 to drop s26 the event at the output end of its queue.

Neural network chips that may for instance be used in some embodiments of the invention include, without limiting in any way the invention, a CogniMem chip (for more information see for instance: "CogniMem Evaluation Boards; CM-EB and CM-IR Hardware Datasheet; Version 1.8, A product of Recognetics"); a NC3003 chip (for more information see for instance: "NC3003 TOTEM Digital Processor for Neural Networks; DATA SHEET; Rel. 12/99"); or a CM-1K chip (for more information see for instance: "CogniMem; CM-1K 1024 neurons on a chip; Rev 03-08").

The physical entities according to the invention or according to embodiments thereof, including the device 10, the event selector 20, the event type recognizer 30 and the processing assembly 40, may comprise or store computer programs including instructions such that, when the computer programs are executed on the physical entities, steps and procedures according to embodiments of the invention are carried out. The invention also relates to such computer programs for carrying out methods according to the invention, and to any computer-readable medium storing the computer programs for carrying out methods according to the invention.

Where the terms "event selector", "event type recognizer" and "processing assembly" are used herewith, no restriction is made regarding how distributed these elements may be and regarding how gathered elements may be. That is, the constituent elements of an event selector, an event type recognizer and a processing assembly may be distributed in different software or hardware components or devices for bringing about the intended function. A plurality of distinct elements may also be gathered for providing the intended functionalities.

Any one of the above-referred elements of a device 10 or a processing assembly 40, may be implemented in hardware, software, field-programmable gate array (FPGA), application-specific integrated circuit (ASICs), firmware or the like.

In further embodiments of the invention, any one of the above-mentioned and/or claimed event selector 20 and event type recognizer 30, etc. is replaced by first event selecting means 20, event type recognizing means 30, etc. respectively, for performing the functions of the event selector 20 and event type recognizer 30, etc.

In further embodiments of the invention, any one of the above-described procedures or steps may be implemented using computer-readable instructions, for example in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A device for processing events, wherein an event includes an identifier identifying the event's type, and at least one parameter carrying information about a process; the device comprising:
    one or more processing circuits configured to function as:
        an event selector;
        an event type recognizer;
    wherein the device is configured to, in response to receiving an event:
        provide the event to the event selector; and
        provide the event's identifier to the event type recognizer, wherein, by providing the event's identifier to the event type recognizer, less than the complete event is provided to the event type recognizer;
    wherein the event selector is configured to store the provided event;
    wherein the event type recognizer is configured to:
        determine, using at least one neural network unit, whether the identifier corresponds to a type for which a subscription exists; and
        in response to determining that the identifier corresponds to a type for which a subscription exists, cause the event selector to transmit the event for processing by one or more applications; and
    wherein the device is configured to enable subscription of one or more types of event using an operation support system (OSS);
    wherein the at least one neural network unit includes:
        either at least one neural network chip being an integrated circuit implementing interconnected artificial neurons for recognizing patterns and capable of being trained to recognize some patterns in an input data; or
        software configured to implement interconnected artificial neurons for recognizing patterns and capable of being trained to recognize some patterns in the input data.

2. The device of claim 1, wherein the events are performance management events.

3. The device claim 1, wherein the event type recognizer is configured to cause the event selector to drop the event in response to determining that the identifier does not correspond to a type for which a subscription exists.

4. The device of claim 1, wherein the event type recognizer is configured to, in response to an application subscribing to one or more type of event, train the at least one neural network unit to recognize a pattern corresponding to the event's type.

5. The device of claim 1, wherein the event selector includes a first-in-first-out queue to store the events.

6. The device of claim 1, wherein the event selector and the event type recognizer are configured to operate using the same clock signal.

7. The device of claim 1, wherein the event type recognizer is configured so that only a portion of the identifier is used in determining whether the identifier corresponds to a type for which a subscription exists.

8. The device of claim 1:
    wherein the event type recognizer is configured to determine, using the at least one neural network unit, whether a number n of identifiers correspond to a set of types being a set for which a subscription exists;
    wherein the set includes a number n of types;
    wherein n is an integer equal or larger than two;
    wherein the event type recognizer is configured to, in response to determining that the n identifiers correspond to the set of types, cause the event selector to transmit at least one of the events corresponding to the set of types for processing by one or more applications.

9. The device of claim 8, wherein n equals 2.

10. The device of claim 8, wherein the event type recognizer is configured so that only a portion of each one of the n identifiers is used in the determining whether the n identifiers correspond to the set of types.

11. A method for processing events, wherein an event includes an identifier identifying the event's type, and at least one parameter carrying information about a process, the method comprising:
    receiving an event;
    providing the event as input to an event selection procedure;
    providing the event's identifier as input to an event type recognizing procedure, wherein, by providing the event's identifier to the event type recognizing procedure, less than the complete event is provided to the event type recognizing procedure;
    the event selection procedure storing the provided event;
    the event type recognizing procedure:
        determining, using at least one neural network unit, whether the identifier corresponds to a type for which a subscription exists;
        in response to determining that the identifier corresponds to a type for which a subscription exists, causing the event selection procedure to transmit the event for processing by one or more applications;
    a subscribing procedure enabling one or more types of event to be subscribed using an operation support system (OSS):
    wherein the at least one neural network unit includes:
        either at least one neural network chip being an integrated circuit implementing interconnected artificial neurons for recognizing patterns and capable of being trained to recognize some patterns in an input data; or
        software configured to implement interconnected artificial neurons for recognizing patterns and capable of being trained to recognize some patterns in the input data.

12. The method of claim 11, wherein the events are performance management events.

13. The method of claim 11, wherein, in response to determining that the identifier does not correspond to a type for which a subscription exists, the event type recognizing procedure causes the event selection procedure to drop the event.

14. The method of claim 11, wherein subscribing by an application to one or more type of event causes the event type recognizing procedure to train the at least one neural network unit to recognize a pattern corresponding to the event's type.

15. The method of claim 11, wherein the event selection procedure operates a first-in-first-out queue to store the events provided as input.

16. The method of claim 11, wherein the event selection procedure and the event type recognizing procedure are carried out using the same clock signal.

17. The method of claim 11, wherein the event type recognizing procedure uses only a portion of the identifier in determining whether the identifier corresponds to a type for which a subscription exists.

18. The method of claim 11:
   wherein the event type recognizing procedure determines, using the at least one neural network unit, whether a number n of identifiers correspond to a set of types being a set for which a subscription exists;
   wherein the set includes a number n of types;
   wherein n is an integer equal or larger than two;
   wherein the event type recognizing procedure, in response to determining that the n identifiers correspond to the set, causes the event selection procedure to transmit at least one of the events corresponding to the set for processing by one or more applications.

19. The method of claim 18, wherein n equals 2.

20. The method of claim 18, wherein the event type recognizing procedure uses only a portion of each one of the n identifiers in determining whether a number n of identifiers correspond to a set of types being a set for which a subscription exists.

\* \* \* \* \*